(12) United States Patent
Morishige

(10) Patent No.: US 6,597,810 B1
(45) Date of Patent: Jul. 22, 2003

(54) IMAGE PROCESSOR

(75) Inventor: Takayuki Morishige, Kyoto (JP)

(73) Assignee: Matsushita Electrical Industrial Co., Ltd., Osaka (JP)

(*) Notice: Subject to any disclaimer, the term of this patent is extended or adjusted under 35 U.S.C. 154(b) by 0 days.

(21) Appl. No.: 09/463,945

(22) PCT Filed: Jun. 25, 1999

(86) PCT No.: PCT/JP99/03426

§ 371 (c)(1),
(2), (4) Date: Feb. 7, 2000

(87) PCT Pub. No.: WO99/67742

PCT Pub. Date: Dec. 29, 1999

(30) Foreign Application Priority Data

Jun. 25, 1998 (JP) .......................................... 10-178334

(51) Int. Cl.[7] .............................................. G06K 9/36
(52) U.S. Cl. .................................................. 382/232
(58) Field of Search ................................ 382/232, 233, 382/234–236, 238–253; 348/571, 721; 345/505, 506, 554, 555, 556, 565, 530; 711/147, 148, 152, 153; 712/20, 21, 22, 35

(56) References Cited

U.S. PATENT DOCUMENTS

| | | | |
|---|---|---|---|
| 5,761,726 A | * | 6/1998 | Guttag et al. ................ 711/147 |
| 6,041,400 A | * | 3/2000 | Ozcelik et al. ............... 712/35 |
| 6,124,866 A | * | 9/2000 | Asano et al. ................ 345/505 |
| 6,459,429 B1 | * | 10/2002 | Deering ...................... 345/423 |

FOREIGN PATENT DOCUMENTS

| | | |
|---|---|---|
| JP | 7-182523 | 7/1995 |
| JP | 8-137739 | 5/1996 |
| JP | 10-108199 | 4/1998 |

OTHER PUBLICATIONS

Masayuki Mizuno et al., "A 1.5W Single –Chip MPEG2 MP@ML Encoder with Low–Power Motion Estimation and Clocking", IEEE International Solid–State Circuits Conference, 1997.

Yasushi Ooi et al., "Development of MPEG2 MP@ML–Based Single–Chip Encoding LSI", Apr. 1997, Nikkei Electronics, w/partial English translation.

Osamu Ohnishi et al., "Memory Architecture in a 1–Chip MPEG2 MP@ML Video Encoder LSI", The IEICE General Conference, 2/partial English translation.

Yasushi Ooi et al., "A Single–Chip MPEG2 MP@ML Video Encoder LSI", The 1997 IEICE General Conference.

Masayuki Mizuno et al., "A 1.5–W single–chip MPEG–2 MP@ML video encoder with low power motion estimation and clocking", IEEE Journal of Solid–State Circuits, pp. 1807–1816, vol. 32, No. 11, Nov. 1997.

European Search Report (dated Mar. 19, 2003).

* cited by examiner

*Primary Examiner*—Jose L. Couso
(74) *Attorney, Agent, or Firm*—Nixon Peabody LLP; Thomas W. Cole

(57) ABSTRACT

An image processing device having a plurality of cores which attains more efficient memory access than conventionally attained. In the image processing device employing pipeline processing, a memory access section 20 executes data transfer between an operation section 10 including a plurality of cores each performing operation for image processing and an external memory 2. The memory access section 20 has an access schedule storage portion 22 which stores types of data transfers per stage, and executes data transfer between the operation section 10 and the external memory 2 in accordance with the storage contents of the access schedule storage portion 22. A system control section 30 sets the types of data transfers in the access schedule storage portion 22 at a stage preceding the stage at which the data transfers are executed. This makes it possible to change the types of data transfers with stages flexibly and thus allows the memory access section 20 to execute only necessary data transfers at each stage without the necessity of arbitration.

5 Claims, 12 Drawing Sheets

Fig. 9

⟨B picture encoding⟩

| | 3 | 4 | 5 | 6 | 7 | 8 | 9 | 10 | 11 | 12 | 13 | 14 | 15 |
|---|---|---|---|---|---|---|---|---|---|---|---|---|---|
| Enable register (MSB→LSB) | | | | | | | | | | | | | |
| For mode 0 | 1 | 1 | 1 | 1 | 1 | 1 | 1 | 1 | 1 | 1 | 1 | 1 | 1 |
| For mode 1 | 1 | 1 | 1 | 1 | 1 | 1 | 1 | 1 | 1 | 1 | 1 | 1 | 1 |
| For mode 2 | 0 | 0 | 1 | 1 | 1 | 1 | 1 | 1 | 1 | 1 | 1 | 1 | 1 |
| For mode 3 | 0 | 0 | 0 | 1 | 1 | 1 | 1 | 1 | 1 | 1 | 1 | 1 | 1 |
| For mode 4 | 0 | 0 | 0 | 0 | 0 | 0 | 0 | 0 | 0 | 0 | 0 | 0 | 0 |
| For mode 5 | 0 | 0 | 0 | 0 | 0 | 0 | 0 | 0 | 0 | 0 | 0 | 0 | 0 |
| For mode 6 | 0 | 0 | 0 | 0 | 0 | 0 | 0 | 1 | 1 | 1 | 1 | 1 | 1 |
| For mode 7 | 0 | 0 | 0 | 0 | 0 | 0 | 0 | 0 | 1 | 1 | 1 | 1 | 1 |
| Modes | | | | | | | | | | | | | |
| Mode 0 | $1 | $1 | $1 | $1 | $1 | $1 | $1 | $1 | $1 | $1 | $1 | $1 | $1 |
| Mode 1 | $2 | $2 | $2 | $2 | $2 | $2 | $2 | $2 | $2 | $2 | $2 | $2 | $2 |
| Mode 2 | $3 | $3 | $3 | $3 | $3 | $3 | $3 | $3 | $3 | $3 | $3 | $3 | $3 |
| Mode 3 | $4 | $4 | $4 | $4 | $4 | $4 | $4 | $4 | $4 | $4 | $4 | $4 | $4 |
| Mode 4 | $6 | $6 | $6 | $6 | $6 | $6 | $6 | $6 | $6 | $6 | $6 | $6 | $6 |
| Mode 5 | $7 | $7 | $7 | $7 | $7 | $7 | $7 | $7 | $7 | $7 | $7 | $7 | $7 |
| Mode 6 | $8 | $8 | $8 | $8 | $8 | $8 | $8 | $8 | $8 | $8 | $8 | $8 | $8 |
| Mode 7 | $A | $A | $A | $A | $A | $A | $A | $A | $A | $A | $A | $A | $A |
| Parameters | | | | | | | | | | | | | |
| Parameter0 | $0000 | $0001 | $0002 | $0003 | $0004 | $0005 | $0006 | $0007 | $0008 | $0009 | $000A | $000B | $000C |
| Parameter1 | $0003 | $0004 | $0005 | $0006 | $0007 | $0008 | $0009 | $000A | $000B | $000C | $000D | $000E | $000F |
| Parameter2 | X | X | *1 | *1 | *1 | *1 | *1 | *1 | *1 | *1 | *1 | *1 | *1 |
| Parameter3 | X | X | X | *2 | *2 | *2 | *2 | *2 | *2 | *2 | *2 | *2 | *2 |
| Parameter4 | X | X | X | X | X | X | X | X | X | X | X | X | X |
| Parameter5 | X | X | X | X | X | X | X | X | X | X | X | X | X |
| Parameter6 | X | X | X | X | X | X | X | *3 | *3 | *3 | *3 | *3 | *3 |
| Parameter7 | X | X | X | X | X | X | X | X | *4 | *4 | *4 | *4 | *4 |

IMAGE PROCESSOR

TECHNICAL FIELD

The present invention relates to an image processing device, and more particularly, to a technique for controlling requests for access to a memory from a plurality of cores.

BACKGROUND ART

Prior art on the above technique will be described in the context of MPEG2 video encoding as an example.

In MPEG2 video encoding, an entire image is divided into units called macro-blocks each consisting of 16 pixels vertical ×16 pixels horizontal in a lattice shape, and image signals are encoded every macro-block. Encoding of one macro-block is independent from that of others.

In such image encoding, pipeline processing per macro-block is employed for improving the throughput. In order to perform the pipeline processing, an MPEG2 video encoding system incorporates therein exclusive arithmetic elements for performing operations required for the encoding, such as motion vector detection, DCT operation, and quantization operation. Hereinafter, such exclusive arithmetic elements are referred to as "cores".

Herein, also, the processing unit time of the pipeline processing is referred to as a "macro-block period", and processing units obtained by sectioning the pipeline processing every macro-block period are referred to as "macro-block stages" or simply "stages".

At a given stage, the cores perform respective types of processing for different macro-blocks in parallel. During such processing, the cores send requests for access to a memory independently. Therefore, in order to ensure normal execution of MPEG2 video encoding, it is necessary to provide a mechanism of exclusively controlling such requests for access to a memory from the plurality of cores at each stage.

FIG. 12 is a view showing a method of controlling memory access employed by a conventional MPEG2 video encoding system (M. Mizuno et al., "A 1.5W Single-Chip MPEG2 MP@ML Encoder with Low-Power Motion Estimation and Clocking", 1997, ISSCC; and O. Ohnishi et al., "Memory Architecture in a 1-Chip MPEG-2 MP@ML Video Encoder LSI", The 1997 IEICE General Conference). In FIG. 12, the y-axis represents the types of cores of the conventional MPEG2 video encoding system and the x-axis represents the time. FIG. 12 shows when, i.e., how many cycles after the start of a stage, data transfer for each core should be started. That is, it shows a schedule of memory access of the cores in one macro-block period.

In the above conventional example, a plurality of access requests are exclusively controlled by fixedly scheduling when and which types of cores are allowed to access to an external memory in one macro-block period. More specifically, a schedule is prepared in advance in such a manner that, for example, data is to be written into a memory from a video input section a given number of cycles after the start of a stage and read from the memory to a motion vector detection section a given number of cycles after the start of the stage.

PROBLEMS THAT THE INVENTION IS TO BE SOLVED

In the above conventional example, memory access at each stage is fixedly scheduled as described above. In order to ensure normal execution of pipeline processing, therefore, it is necessary to set the number of cycles per stage in consideration of the case where the number of cycles required for data transfer for each core is maximum, i.e., in consideration of the worst case.

The inventors of the present invention have examined the conventional example and found that, if the number of cycles per stage is set based on the worst case, it exceeds the upper limit that allows for normal execution of pipeline processing (estimated based on the specification on the operating frequency in the conventional example).

In order to solve the above problem, a conventional encoding system is provided with a cache memory for motion vector detection. Reference image data used during the first search is stored in this cache memory, to be used again during the second search. This omits data transfer from an external memory during the second search and thus reduces the number of cycles required for the entire memory access (Y. Ooi et al, "Development of MPEG2 MP@ML-based Single-Chip Encoding LSI", April 1997, Nikkei Electronics).

However, with such a cache memory provided to reduce the number of cycles for memory access as described above, the power consumption and area of the entire system increase by those of the cache memory itself. In particular, if the system is implemented as an LSI, the increase in power consumption and area is critical.

DISCLOSURE OF INVENTION

The object of the present invention is to attain more efficient memory access than conventionally attained in an image processing device having a plurality of cores. In particular, in an MPEG2 video encoding system, it is ensured that data transfer required for encoding can be executed at the same operating frequency as that used conventionally without providing a cache memory.

Specifically, the present invention is directed to an image processing device for processing an image signal by pipeline processing using an external memory, the device comprising: a plurality of cores each performing operation for image processing; and a memory access section for executing data transfer between the plurality of cores and the external memory, wherein the memory access section includes an access schedule storage portion for storing a type of data transfer for each stage which is a unit of the pipeline processing, and the data transfer between the plurality of cores and the external memory is executed in accordance with storage contents of the access schedule storage portion, and the access schedule storage portion is constructed so that the type of data transfer required at each stage can be set at a stage preceding each stage.

According to the present invention, since the type of data transfer required at each stage can be set at a preceding stage, it is possible to change the type of data transfer with stages flexibly. This allows the memory access section to execute only necessary type of data transfer at each stage without the necessity of arbitration. In this way, efficient memory access is realized.

Preferably, the image processing device according to the present invention further includes a system control section for controlling the plurality of cores and the memory access section, wherein while the system control section instructs the memory access section to execute data transfer, the system control section sets the type of data transfer at a stage subsequent to the present stage in the access schedule storage portion.

In the image processing device, preferably, the memory access section outputs a stage transfer state signal indicating whether or not data transfer has been terminated at each stage, and the system control section instructs the memory access section to execute data transfer at the next stage when the stage transfer state signal indicates termination of data transfer.

The memory access section of the image processing device according to the present invention preferably includes: an interface portion for executing data transfer of a designated type and outputting a local transfer state signal indicating whether or not the data transfer has been terminated; and an access control portion for designating a type of data transfer to activate the interface portion and newly designating a type of data transfer when the local transfer state signal indicates termination of data transfer to activate the interface portion.

The image processing device according to the present invention preferably performs encoding as the processing of an image signal.

BRIEF DESCRIPTION OF DRAWINGS

FIG. 9 is a view showing changes of set values of the respective registers in B picture type encoding.

BEST MODE FOR CARRYING OUT THE INVENTION

Hereinbelow, an embodiment of the present invention will be described with reference to the drawings.

Figure 1:
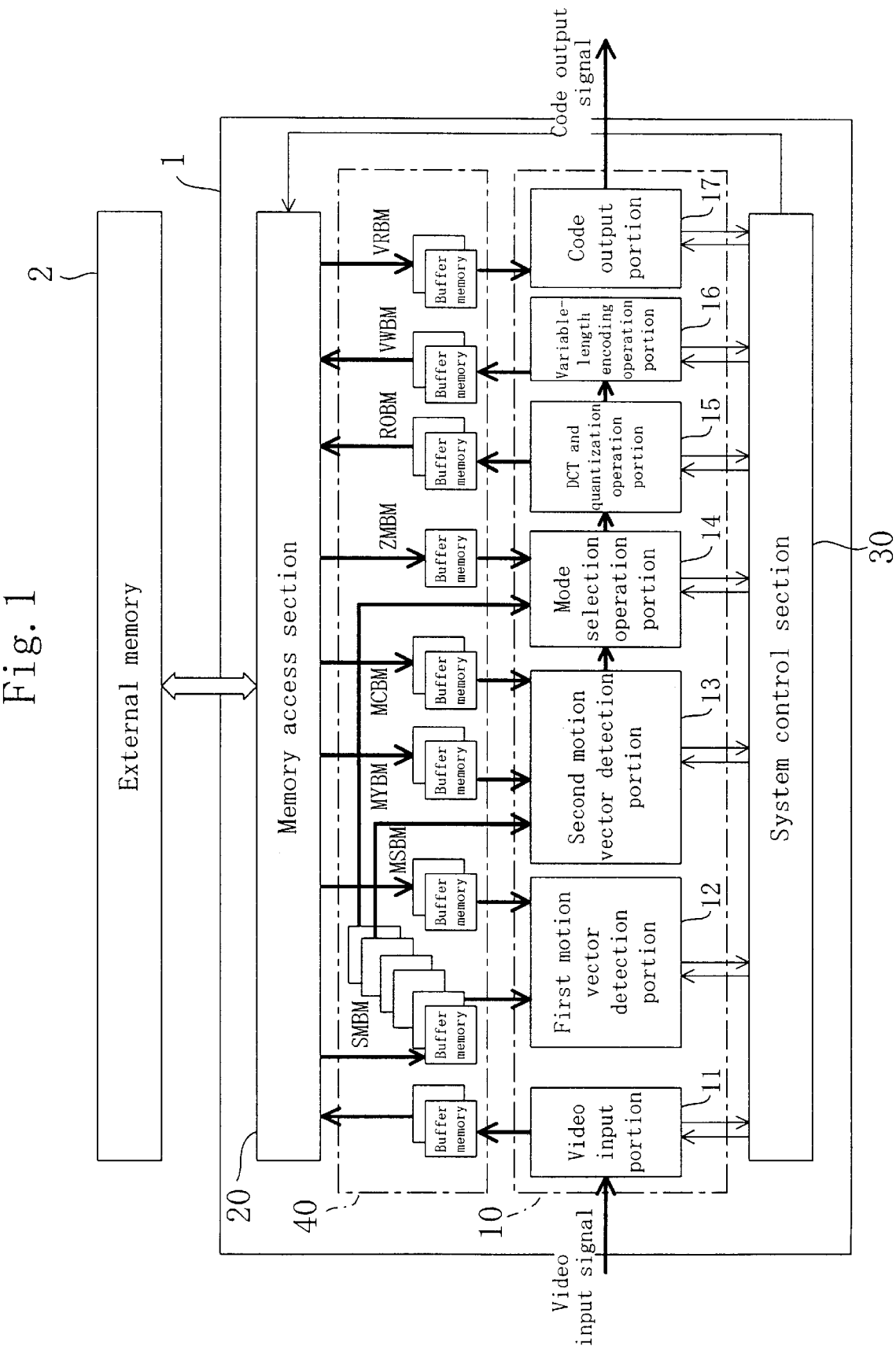
FIG. 1 is a view illustrating the entire construction of an image processing device of one embodiment of the present invention.

FIG. 1 is a view illustrating the entire construction of a system for performing MPEG2 video encoding, as an image processing device according to an embodiment of the present invention. Referring to FIG. 1, the reference numeral 1 denotes a system as an image processing device for processing image signals by pipeline processing, and 2 denotes an external memory composed of a synchronous DRAM or the like for exchanging data with the system 1. The external memory 2 is used for storing original image frame data composed of video input signals, previous image frame data reconstructed for motion vector detection, variable-length encoded data, and the like. The system 1 is implemented as an LSI, for example.

The system 1 includes: an operation section 10 composed of a plurality of cores 11 to 17 which perform operations for encoding; a memory access section 20 which executes data transfer between the external memory 2 and the operation section 10; and a system control section 30 which controls the operation section 10 and the memory access section 20, as well as the entire system 1. Between the operation section 10 and the memory access section 20 is provided a buffer memory group 40 composed of a plurality of buffer memories which serve as buffers for data transfer between the cores 11 to 17 and the memory access section 20.

Figure 2:
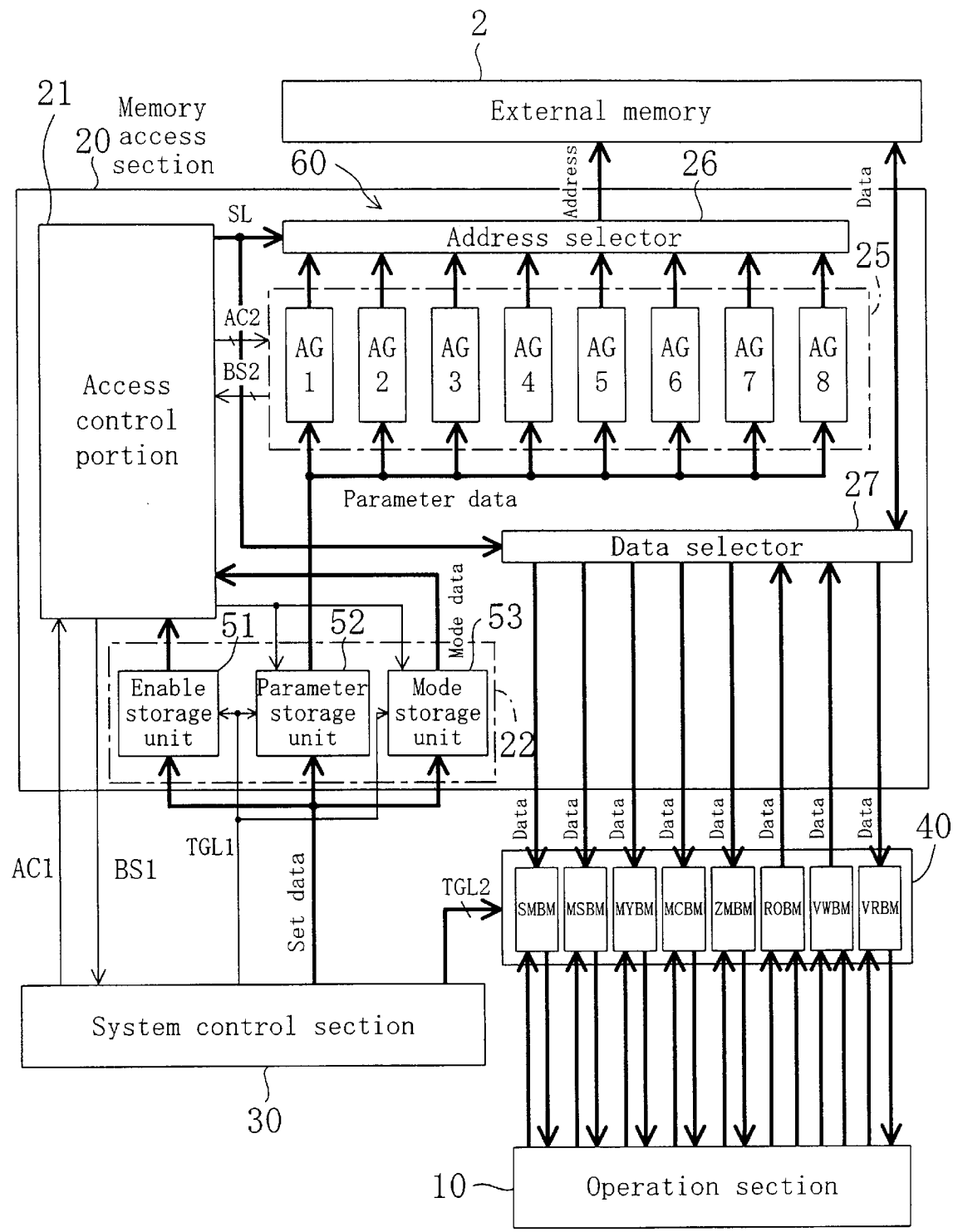
FIG. 2 is a view illustrating the construction of a memory access section shown in FIG. 1.

FIG. 2 is a view illustrating the construction of the memory access section 20 shown in FIG. 1. Referring to FIG. 2, the reference numeral 21 denotes an access control portion which controls the memory access section 20; 22 denotes an access schedule storage portion which stores the types and order of data transfers for each stage; 25 denotes an address generator group composed of a plurality of address generators (AG) provided for the respective types of data transfers, which generate addresses for accessing the external memory 2; 26 denotes an address selector; and 27 denotes a data selector. Address generators AG1 to AG8 of the address generator group 25 correspond to buffer memories SMBM, MSBM, MYBM, MCBM, ZMBM, ROBM, VWBM, and VRBM of the buffer memory group 40, respectively. The address generator group 25, the address selector 26, and the data selector 27 constitute an interface portion 60.

The access schedule storage portion 22 is composed of an enable storage unit 51, a parameter storage unit 52, and a mode storage unit 53. Each of the enable storage unit 51, the parameter storage unit 52, and the mode storage unit 53 is of a 2-bank structure, where when one bank is accessible for the access control portion 21 (i.e., one bank is turned to the memory access section 20), the other bank is accessible for the system control section 30 (i.e., the other bank is turned to the system control section 30) so that the storage contents thereof can be set.

The system control section 30 switches the banks of the access schedule storage portion 22 through a first toggle signal TGL1, to set the types and order of data transfers for the bank turned to the system control section 30. The bank switch through the first toggle signal TGL1 is synchronized with stage switch in the pipeline processing.

In other words, the access schedule storage portion 22 is constructed so that the types and order of data transfers at each stage can be set at a preceding stage. While the system control section 30 outputs a start signal AC1 to the access control portion 21 at each stage to instruct the memory access section 20 to execute data transfer, it sets the types and order of data transfers at a subsequent stage in the access schedule storage portion 22.

This means that the types and order of data transfers at each stage can be set in one bank of the 2-bank structure access schedule storage portion 22 by the system control section 30 at a preceding stage. Every time the stage is switched, the bank of the access schedule storage portion 22 is switched, allowing the bank in which the types and order of data transfers have been set at the preceding stage to be accessed by the access control portion 21, so that data transfer at the present stage is executed based on the storage contents of this bank.

Thus, exchange of data with the external memory 2 required for encoding is effected by repeatedly setting at each stage the types and order of data transfers to be executed at a subsequent stage.

Most of the buffer memories of the buffer memory group 40 are also of a two or more bank structure. The system control section 30 switches the banks of the buffer memories through a second toggle signal TGL2.

Figure 3:
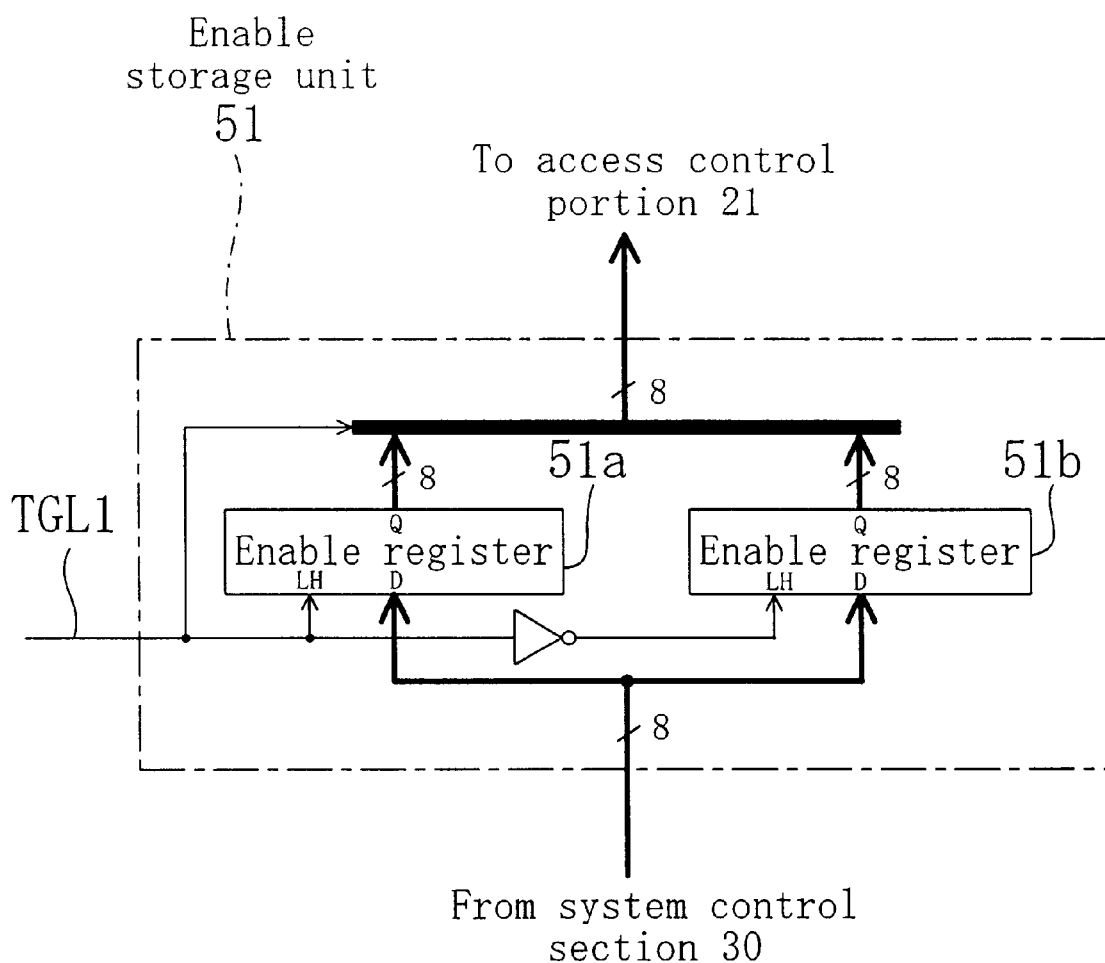
FIG. 3 is a view illustrating the construction of an enable storage unit shown in FIG. 2.

FIG. 3 is a view illustrating the construction of the enable storage unit 51 shown in FIG. 2. Referring to FIG. 3, the enable storage unit 51 includes two 8-bit enable registers 51a and 51b (2-bank structure) which can be switched by the first toggle signal TGL1 sent from the system control section 30.

The parameter storage unit 52 includes two parameter register groups each composed of eight (corresponding to the number of bits of the enable registers 22a and 22b) 16-bit registers (2-bank structure) which can be switched by the first toggle signal TGL1. The mode storage unit 53 also includes two mode register groups each composed of eight 4-bit registers (2-bank structure) which can be switched by the first toggle signal TGL1. The mode registers and the parameter registers are in the one-to-one relationship. Each mode register stores a type of data transfer, whereas each parameter register stores a parameter required for data transfer of the type stored in the corresponding mode register.

Figure 4:
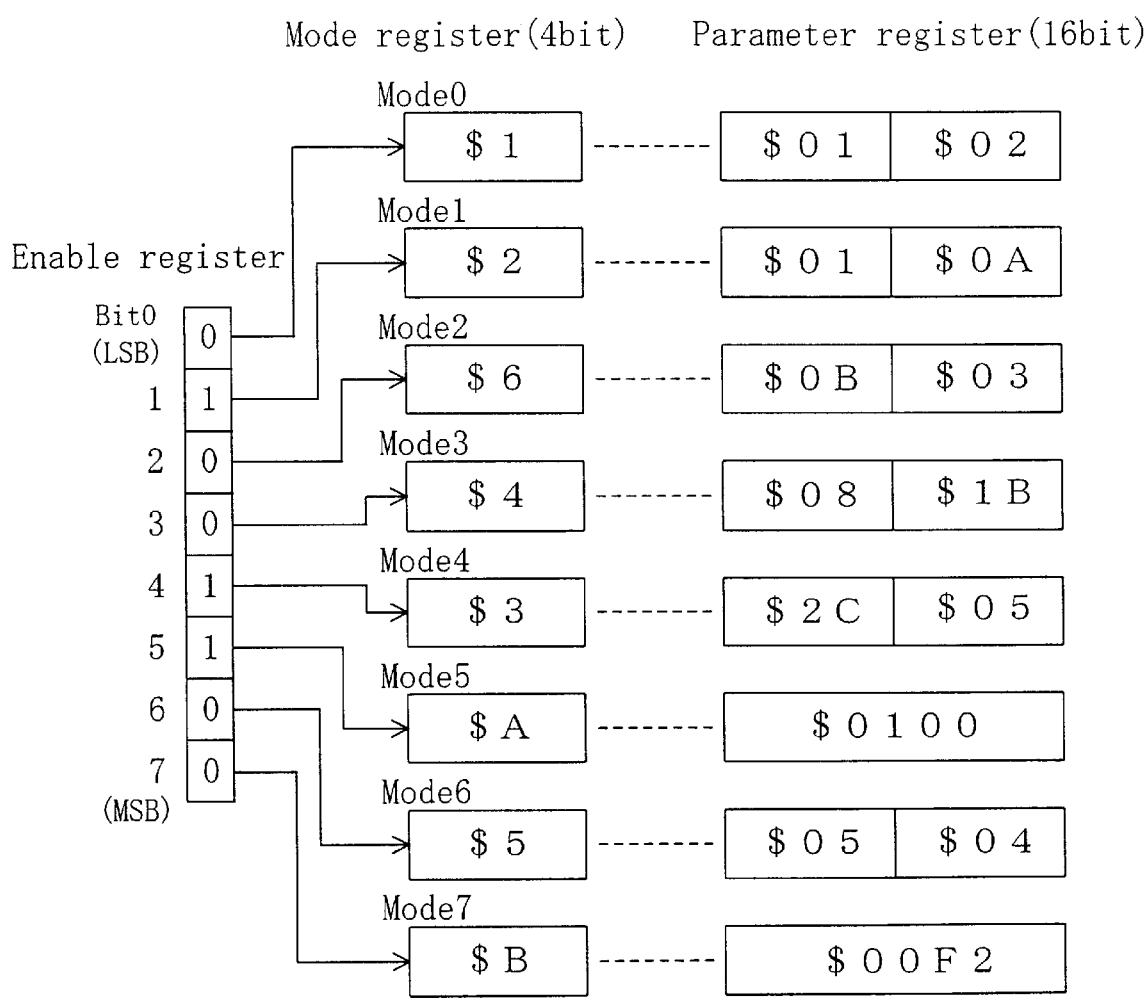
FIG. 4 is a view illustrating an example of the storage contents of an access schedule storage portion shown in FIG. 2.

FIG. 4 is a view showing an example of storage contents of the access schedule storage portion 22. Referring to FIG. 4, the operation of the memory access section 20 will be described.

On receipt of the start signal AC1 from the system control section 30, the access control portion 21 examines the value stored in one of the two enable registers of the enable storage unit 51 which corresponds to the bank turned to the memory access section 20 bit by bit from LSB toward MSB. The bits of the enable register, which are either "0" representing transfer prohibit and "1" representing transfer permit, correspond to the respective mode resisters. More specifically, when the examined bit is "1", data transfer of the type stored in the corresponding mode register is executed, and when the examined bit is "0", data transfer of the type stored in the corresponding mode register is not executed. When data transfer of the type stored in the mode register is executed, the value stored in the parameter register corresponding to this mode register is used as a parameter for the data transfer.

For example, as shown in FIG. 4, assume that the value held in the enable register is "00110010". In this case, first, since the LSB (bit 0) is "0", data transfer of the type stored in the mode register of mode 0 is not executed.

The next bit, bit 1, is "1". Therefore, data transfer of the type stored in the mode register of mode 1 is executed. The access control portion 21 examines the value stored in the mode register of mode 1 to specify data transfer of the type to be executed and selects the address generator to be activated. In this example, the mode register of mode 1 stores $2 ($ represents hexadecimal notation) which is herein assumed to indicate that "NoMC macro-block input" should be performed. The NoMC macro-block refers to a macro-block which does not require motion compensation because the difference in luminance from the preceding image is too great or it is little observed.

The access control portion 21 recognizes that it should perform "NoMC macro-block input" by decoding the value of the mode register of mode 1, and sends a start signal AC2 to the address generator for NoMC macro-block input. The address generator which has received the start signal AC2 generates an address for accessing the external memory 2 using the value of the parameter register of mode 1 ($01, $0A). The parameter register of mode 1 stores the heading address of a macro-block to be input as the parameter corresponding to the "NoMC macro-block input".

The access control portion 21 also instructs the address selector 26 by sending a select signal SL to selectively output to the external memory 2 an address and a control signal output from the address generator for NoMC macro-block input. Likewise, the access control portion 21 instructs the data selector 27 by the select signal SL to selectively output data output from the external memory 2 to the buffer memory for NoMC macro-block input of the buffer memory group 40.

The address generator which has received the start signal AC2 activates a busy signal BS2 as a local transfer state signal during the execution of data transfer. The busy signal BS2 is inactivated upon termination of the data transfer, notifying the access control portion 21 of the termination of the data transfer. Upon confirmation of the termination of the data transfer by the address generator, the access control portion 21 restarts the examination of the enable register.

Since bits 2 and 3 of the enable register are "0", data transfers of the types stored in the mode registers of modes 2 and 3 are not executed.

The next bit, bit 4, is "1". Therefore, the access control portion 21 executes data transfer of the type stored in the mode register of mode 4. The mode register of mode 4 stores $3 (3 in hexadecimal notation) which is in this example assumed to indicate that "variable-length code output" should be performed. The access control portion 21 sends the start signal AC2 to the address generator for variable-length code output. The address generator which has received the start signal AC2 generates an address for accessing the external memory 2 using the value of the parameter register of mode 4. The parameter register of mode 4 stores the number of words to be transferred and the like as the parameter corresponding to the "variable-length code output".

Upon termination of the examination of all the bits of the value stored in the enable register, the access control portion 21 notifies the system control section 30 of termination of data transfer for this stage by sending a busy signal BS1 as a stage transfer state signal. In this way, data transfer between the external memory 2 and the plurality of cores 10 at one macro-block stage is completed.

Figure 5:
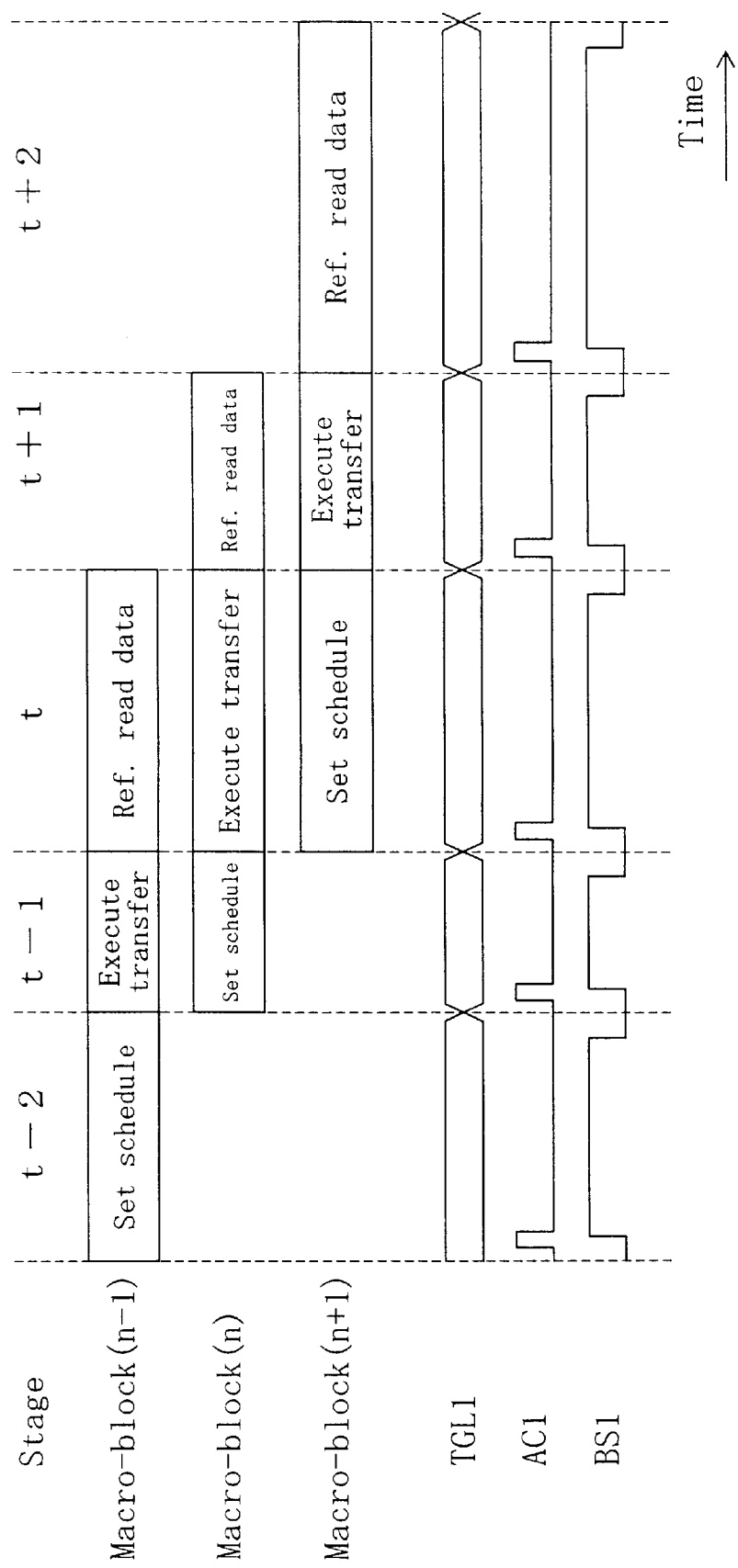
FIG. 5 is a timing chart illustrating the timing of data transfers executed by the memory access section shown in FIG. 1.

FIG. 5 is a timing chart showing the timing of data transfer executed by the memory access section 20. FIG. 5 shows, as an excerpted example, the case where a code output portion 17 reads data from the external memory 2 for the processing of macro-blocks (n−1) to (n+1) in a series of steps of image encoding from video signal input to code signal output. It should be noted that when data is to be written into the external memory 2, setting of write data is required in addition to the schedule setting.

At each stage, the time required to access the external memory 2 is considerably longer than the time required for each of the plurality of cores to perform its operation.

Accordingly, the number of cycles at each stage is determined by the number of cycles required for data transfer. The data transfer is executed substantially without loss of time at each stage, and when data transfer at one stage is terminated, data transfer at the next stage is immediately started. For these reasons, in this embodiment, the number of cycles for one stage is different from that for another stage as shown in FIG. 5.

Hereinbelow, the operation of the image processing device of this embodiment will be described specifically taking the case of MPEG2 encoding as an example. In MPEG2, each frame is divided into macro-blocks of (16×16) pixels and compression encoding is performed every macro-block. For example, in the case of NTSC images where one frame is consisted of 720 pixels×480 lines, one frame is divided into 1350 (=45 horizontal×30 vertical) macro-blocks.

Figure 6:
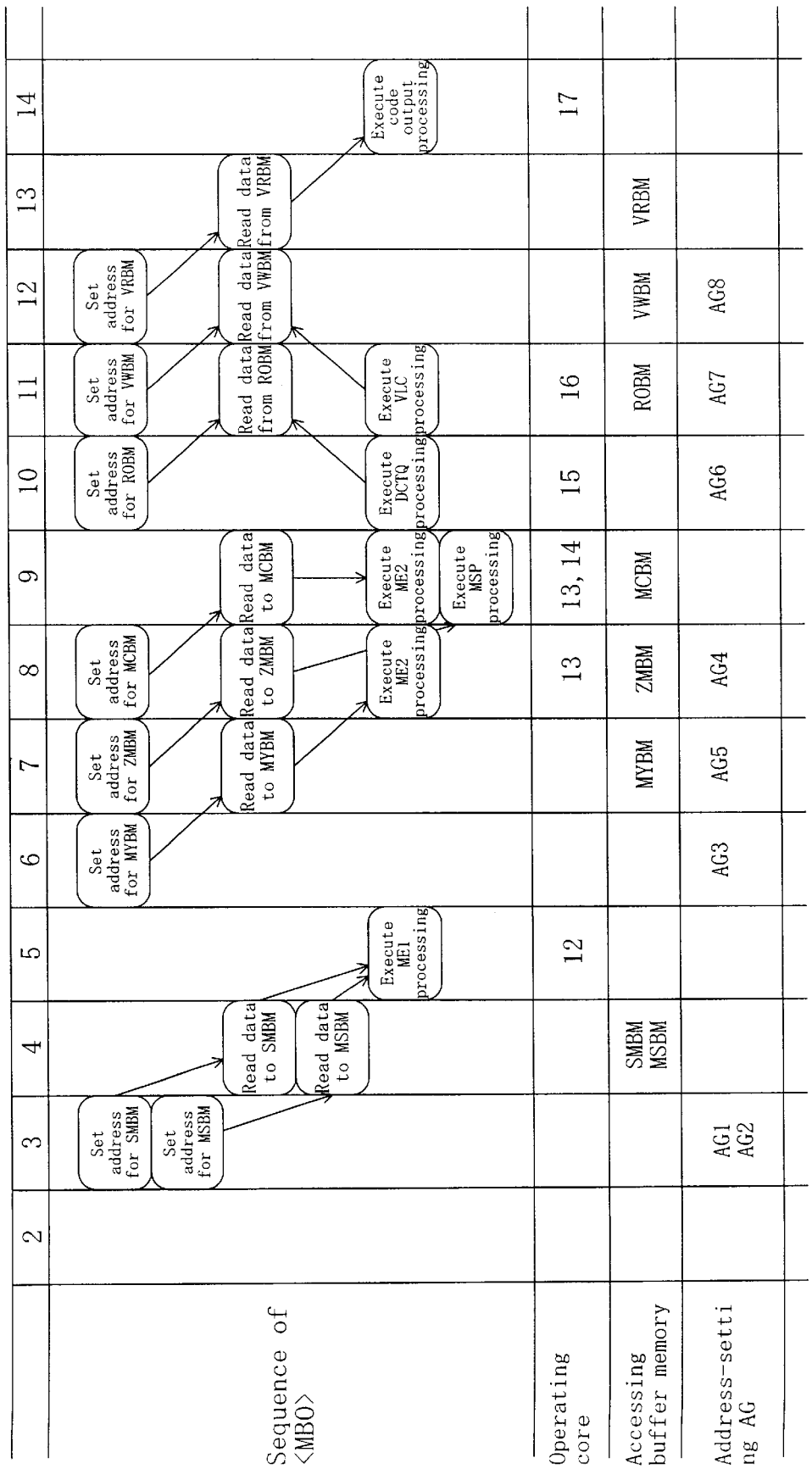
FIG. 6 is a view illustrating a flow of encoding in one macro-block.

FIG. 6 is a view showing a flow of encoding of one macro-block MB0. In FIG. 6, the x-axis represents the stage, and each arrow shows the relationship between one address setting and the corresponding data transfer, as well as the relationship between one data transfer and the corresponding core processing. FIG. 6 also shows the operating core, the buffer memory accessing the external memory 2, and the address-setting address generator at each stage in the flow of the encoding.

The respective types of processing by the cores shown in FIG. 6 will be described.

<ME1 Processing>

This processing refers to one-pixel precision motion vector detection executed by a first motion vector detection portion 12. Macro-block data of an original image to be encoded is read from the external memory 2 to the buffer memory SMBM. Likewise, Y-component data of a reference image frame is read from the external memory 2 to the buffer memory MSBM. The first motion vector detection portion 12 detects a one-pixel precision motion vector from the data stored in the buffer memories SMBM and MSBM. Prior to the data transfer to the buffer memories SMBM and MSBM, the system control section 30 sets the position of the macro-block to be encoded as a parameter.

<ME2 Processing>

This processing refers to half-pixel precision motion vector detection executed by a second motion vector detection portion 13. In the first ME2 processing, Y-component data of a reference image in the region indicated by the motion vector output from the first motion vector detection portion 12 is read from the external memory 2 to the buffer memory MYBM. The second motion vector detection portion 13 detects half-pixel precision motion vector using the data stored in the buffer memory SMBM and the data stored in the buffer memory MYBM.

In the second ME2 processing, C-component data of the reference image frame is read from the external memory 2 to the buffer memory MCBM. The second motion vector detection portion 13 detects half-pixel precision motion vector from the data stored in the buffer memories SMBM and MCBM using the motion vector obtained in the first ME2 processing.

<MSP Processing>

This processing refers to mode selection of processing required for encoding, such as whether DCT operation should be performed every frame or every field, executed by a mode selection operation portion 14. When the value of the motion vector obtained in the <ME1 processing> and the <ME2 processing> is 0, a reference image at the same position as that of the macro-block to be encoded is read from the external memory 2 to the buffer memory ZMBM.

<DCT/Q Processing>

This processing refers to a sequential processing of DCT operation→quantization→reverse DCT operation→reverse quantization performed for a differential image between the macro-block and a reference image at a position indicated by the motion vector obtained in the <ME1 processing> and the <ME2 processing>, executed by a DCT and quantization operation portion 15. This processing is performed in accordance with the mode selected in the <MSP processing>. A reverse-DCT operated image data is stored in the buffer memory ROBM and transferred to the external memory 2 to be used as a reference image during encoding of another frame (reconstruction (REC)).

<VLC Processing>

This processing refers to variable-length encoding of data quantized in the <DCT/Q processing>, executed by a variable-length encoding operation portion 16. The variable-length encoded data is stored in the buffer memory VWBM, and temporarily written into the external memory 2 for buffering. The data amount after the variable-length encoding is reported to the system control section 30 by the variable-length encoding operation portion 16. Based on the data amount after the variable-length encoding, the system control section 30 sets the number of transfer words as a parameter for data transfer from the buffer memory VWBM.

<Code Output Processing>

The code output portion 17 outputs the variable-length encoded data at the timing requested by a device externally connected to the system 1. The buffer memory VRBM is used as a buffer for external output. The system control section 30 sets the number of transfer words as a parameter for the data transfer from the buffer memory VRBM in correspondence with the transfer timing requested by the external device.

Figure 7:
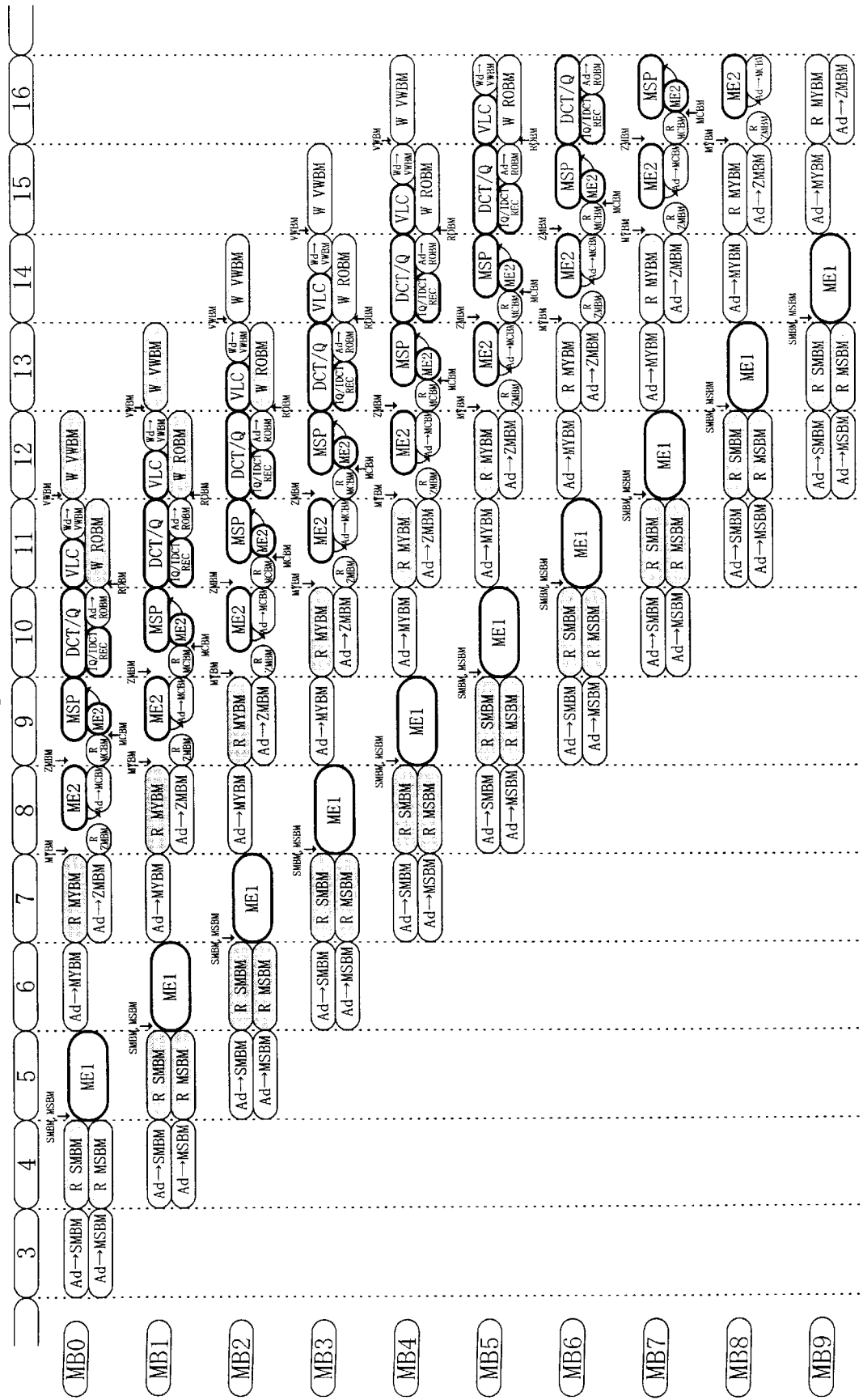
FIG. 7 is a view illustrating a flow of the entire pipeline processing which realizes MPEG2 encoding.

FIG. 7 is a view showing a flow of the entire pipeline processing which realizes MPEG2 encoding. MPEG2 standard defines three picture types of I, P, and B. FIG. 7 shows the case of the P picture type which entails the largest number of data transfers among the three. The number of types of processing gradually increases until stage 11, and at and after stage 12 substantially the same types of processing are repeatedly executed at the respective stages.

In the I picture type, encoding is performed without referring to other frames at all. Therefore, any processing relating to the motion vector detection (ME1 processing and ME2 processing) is not executed, and thus data transfers to the buffer memories MSBM, MYBM, and MCBM are not involved. The B picture type is not referred to by other frames. The reconstruction (REC) is therefore unnecessary, and thus data transfer from the buffer memory ROBM is not involved. Data transfer to the buffer memory ZMBM is not involved, either, due to another reason.

Since the types of required data transfer vary depending on the picture type as described above, it becomes necessary to change the settings of the enable register and the like depending on the picture type.

Figure 8:
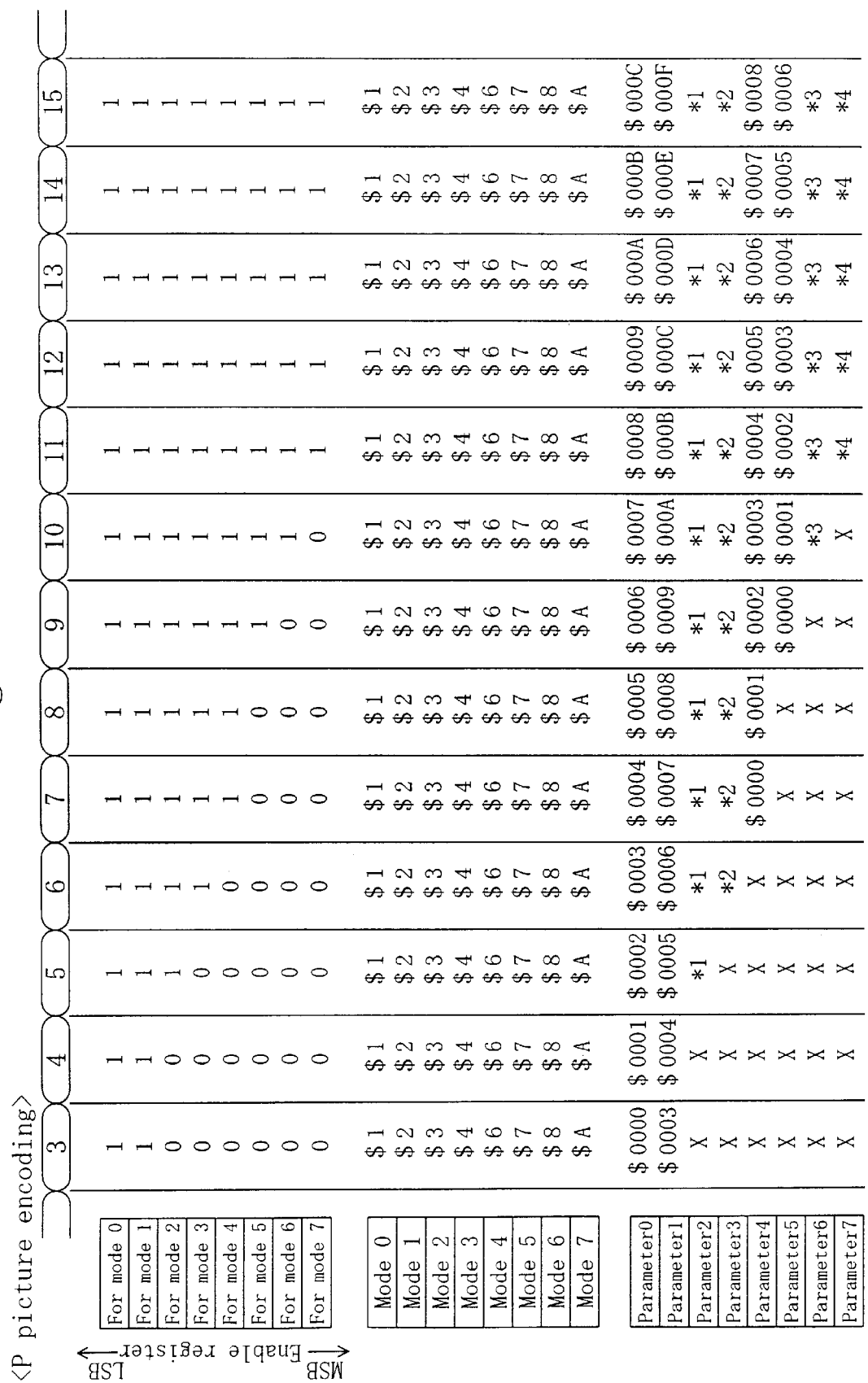
FIG. 8 is a view showing changes of set values of an enable register, a mode register, and a parameter register at respective stages shown in FIG. 7.

FIG. 8 is a view showing changes in the set values of the enable register, the mode register, and the parameter register at the respective stages shown in FIG. 7. The set values $1, $2, $3, $4, $6, $7, $8, and $A of the mode register shown in FIG. 8 correspond to the address generators AG1 to AG8, respectively. As shown in FIG. 8, the bits of the enable register are all "1" at and after stage 11, indicating that all of the address generators AG1 to AG8 are activated for address setting.

Figure 10:
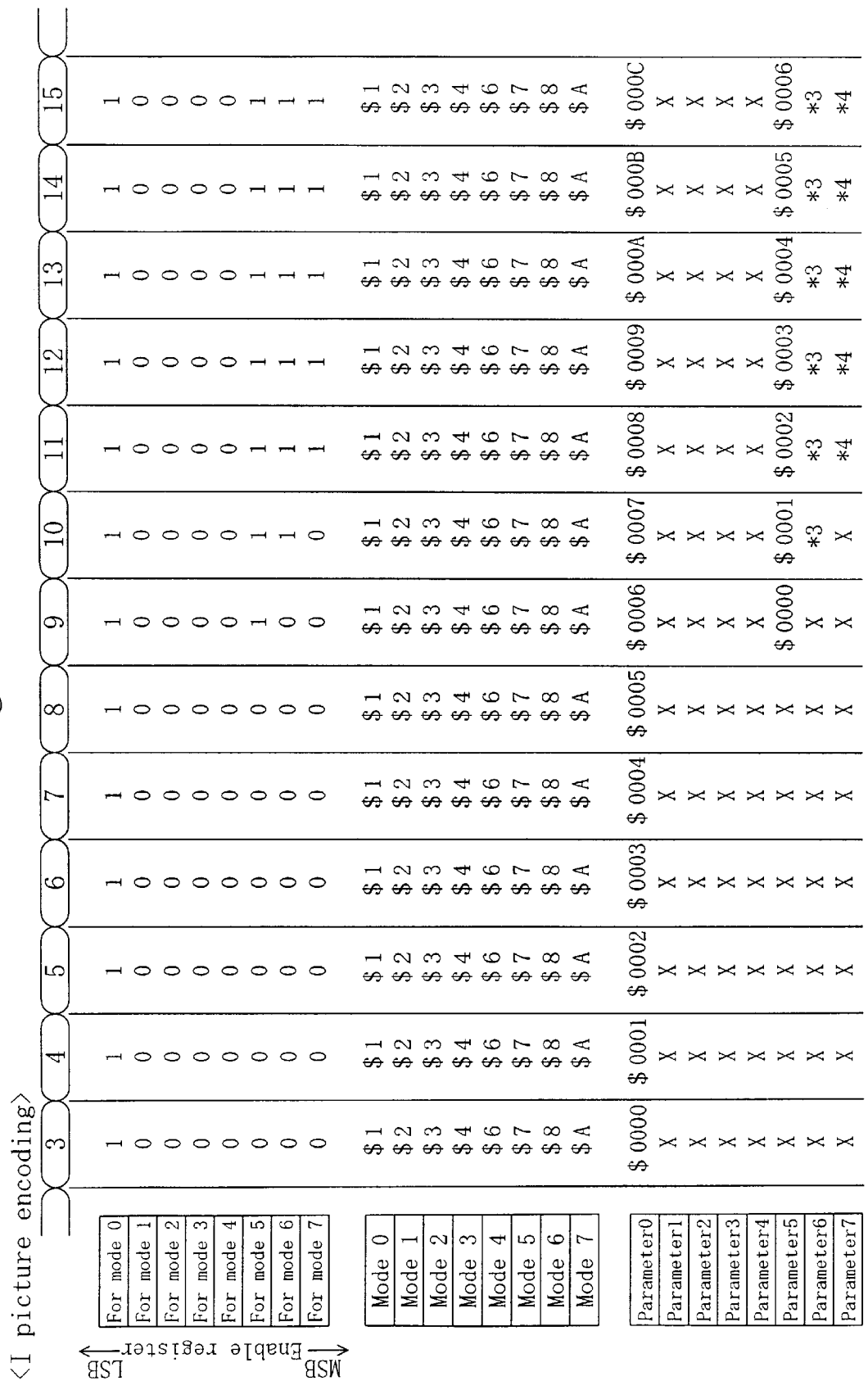
FIG. 10 is a view showing changes of set values of the respective registers in I picture type encoding.

FIG. 9 is a view showing changes in the set values of the respective registers during the encoding of the B picture type. FIG. 10 is a view showing changes in the set values of the respective registers during the encoding of the I picture type. As is observed in comparison with FIG. 8, some bits of the enable register are "0" at and after stage 11.

The system control section 30 stores a sequential pattern of picture types (e.g., "IPPBPPBPPBPPBPP") depending on the application. The values of the respective registers are set based on such a sequential pattern, as shown in FIGS. 8 to 10.

The set values of the mode register are fixed through FIGS. 8 to 10. In other words, the values of the mode register are set based on the P picture type which entails the largest number of data transfers, and whether or not data transfer is necessary is controlled only by the setting of the enable register. Alternatively, it is also possible to control whether or not data transfer is necessary by changing the setting of the mode register.

It is also possible to control the order of data transfers at each stage by the setting of the mode register. In most applications, each data transfer is only required to be completed within the relevant stage. The order of data transfers is not necessarily required to be strictly controlled. Some applications, however, may have a condition that "data transfer to MCBM must precede data transfer to ZMBM", for example. This condition can be satisfied by setting data transfer to MCBM at mode 0 while setting data transfer to ZMBM at mode 1.

The setting of the values of the parameter register is performed in the following manner. In the data transfers in the modes of $1, $2, $6, and $7, data indicating the position of a macro-block is set (parameters 0, 1, 4, and 5). In the data transfers in the modes of $3 and $4, coordinate values *1 and *2 of a transfer source position are set based on the motion vector obtained in the <ME1 processing> (parameters 2 and 3). In the data transfers in the modes of $8 and $A, the number of transfer words *3 and *4 are set (parameters 6 and 7).

As described above, according to the image processing device of this embodiment, the types and order of data transfers can be set per stage in the access schedule storage portion 22, and this setting can be done at a stage preceding the stage at which the data transfer is actually executed. Furthermore, once it is confirmed via the busy signal BS2 that one address generator has completed its task, the next address generator can be immediately started. This makes it possible to continuously perform only necessary data transfers at each stage substantially without loss of time.

Thus, at each stage, the schedule of data transfer with the external memory 2 has been determined by the system control section 30 by the end of the preceding stage. This allows the memory access section 20 to sequentially execute a plurality of data transfers without the necessity of arbitration between the cores 11 to 17. If the amount of data transfer is small, the data transfer can be terminated in a shorter time without wasteful wait time. This ensures normal execution of MPEG2 video encoding without the necessity of providing a buffer memory for omitting data transfer itself.

In this embodiment, the address generators and the buffer memories are in the one-by-one relationship. Alternatively, one address generator may correspond to a plurality of buffer memories, for example. One address generator may also correspond to a plurality of transfer modes. The number of address generators is not limited to eight as described above.

The bit width of the enable register, the number of mode registers, and the number of parameter registers specified in this embodiment are mere examples, and not intended to restrict the present invention.

In this embodiment, the types and order of data transfers at each stage are set at the immediately preceding stage. However, they may be set at any preceding stage other than the immediately preceding stage. For example, in the case where NOP processing is performed at the immediately preceding stage, they may be set at the stage preceding the immediately preceding stage. Alternatively, the access schedule storage portion 22 may be of 3-bank structure, so that the types and order of data transfers at each stage can be set at the 2-stage preceding stage.

Hereinafter, the present invention will be described in a supplemental manner in relation with the problems to be solved discussed in the BACKGROUND ART.

Figure 11:
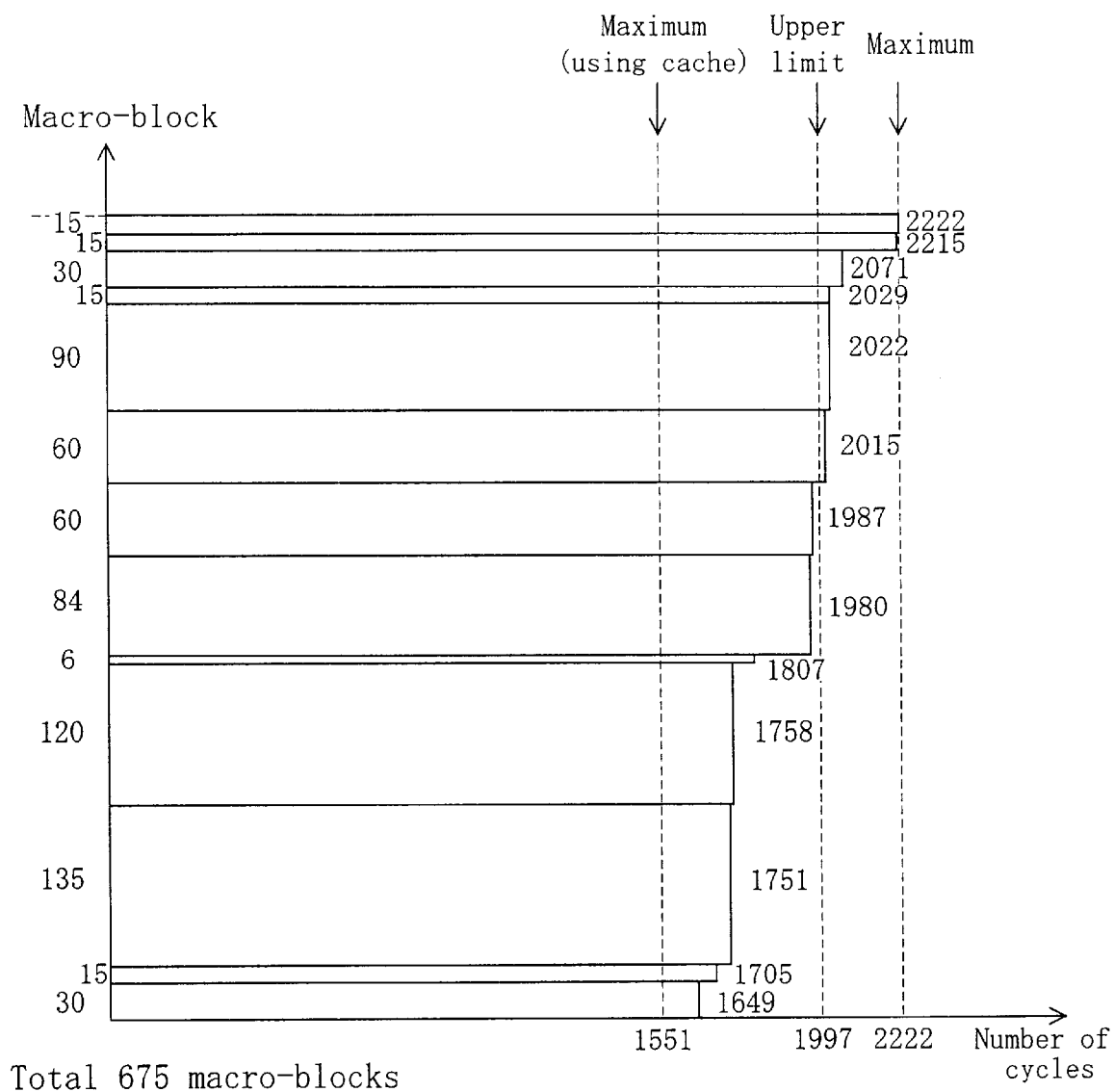
FIG. 11 is a view showing the number of cycles required for data transfer per field, for distinguishing the present invention from the conventional example.
Figure 12:
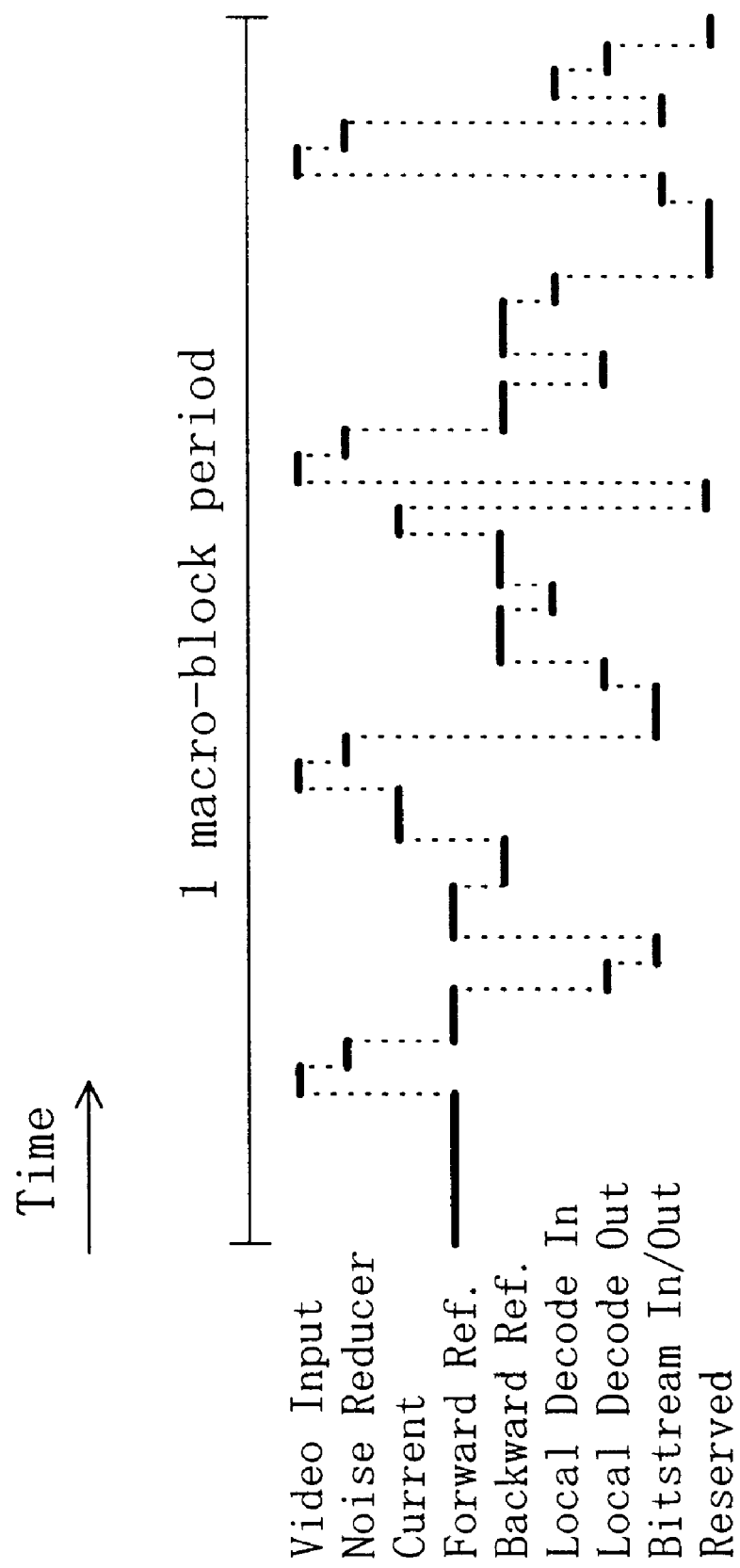
FIG. 12 is a view showing a method of controlling memory access in conventional MPEG video encoding.

FIG. 11 is a view showing the number of cycles required for data transfer between the cores and the external memory in the case of B picture type image encoding (encoding using reference images located before and after the present image in the time axis). The data shown in FIG. 11 is the results of estimation by the inventors of the present invention from MPEG2 standard. In MPEG2 video encoding, the amount of data transfer between the cores and the external memory is not constant through macro-blocks, but varies with macro-blocks depending on the complexity of an image. FIG. 11 shows the distribution of the number of cycles required for data transfer in respective macro-blocks in one field (corresponding to an image of 1/60 sec. in the case of NTSC images), where the maximum value is 2222 and the minimum value is 1649.

Assuming that the entire period including the effective pixel period and the vertical blanking period can be utilized for image encoding of one field, the upper limit value of the number of cycles which can be allocated to encoding of one macro-block is 1997 (estimated using the operating frequency of 81 MHz based on the conventional specification).

In other words, as is observed from FIG. 11, the maximum value of the number of cycles per macro-block exceeds the upper limit value. This means that normal execution of MPEG2 video encoding is not possible unless any measures is taken. In the conventional example, data transfer from the external memory during the second search is omitted by providing a cache memory for motion vector detection, thereby reducing the maximum number of cycles per macro-block to 1551 which is smaller than the upper limit value.

In view of the estimation results as shown in FIG. 11, the inventors of the present invention have paid attention to the point that the average number of cycles per macro-block of one field, i.e., 675 macro-blocks, is less than the upper limit value. This embodiment of the present invention is based on this point, where the number of cycles required for data transfer for each macro-block is averaged so as to ensure the execution of image encoding without providing a cache memory.

If a cache memory is provided as in the conventional example, the application of the present invention can contribute to reducing the clock frequency, for example. This can reduce power consumption.

The present invention is also easily applicable to image processing such as image encoding other than the MPEG2 video encoding and image decoding. Further, the present invention is easily applicable to signal processing other than image processing, if such processing includes memory access from a plurality of accessing elements.

Thus, according to the present invention, data transfer between the plurality of cores and the external memory is sequentially scheduled at a stage preceding the stage at which the data transfer is actually executed. Therefore, the memory access section can execute only necessary types of data transfers at each stage sequentially without the necessity of arbitration. This realizes efficient memory access.

What is claimed is:

1. An image processing device for processing an image signal by pipeline processing using an external memory, the device comprising:

a plurality of cores each performing operation for image processing; and a memory access section for executing data transfer between the plurality of cores and the external memory, wherein the memory access section includes an access schedule storage portion for storing a type of data transfer for each stage which is a unit of the pipeline processing, and the data transfer between the plurality of cores and the external memory is executed in accordance with storage contents of the access schedule storage portion, and the access schedule storage portion is constructed so that the type of data transfer required at each stage can be set at a stage preceding each stage.

2. The image processing device of claim 1, further comprising a system control section for controlling the plurality of cores and the memory access section, wherein while the system control section instructs the memory access section to execute data transfer, the system control section sets the type of data transfer required at a stage subsequent to the present stage in the access schedule storage portion.

3. The image processing device of claim 2, wherein the memory access section outputs a stage transfer state signal indicating whether or not data transfer has been terminated at each stage, and the system control section instructs the memory access section to execute data transfer at the next stage when the stage transfer state signal indicates termination of data transfer.

4. The image processing device of claim 1, wherein the memory access section comprises:

an interface portion for executing data transfer of a designated type and outputting a local transfer state signal indicating whether or not the data transfer has been terminated; and an access control portion for designating a type of data transfer to activate the interface portion and newly designating a type of data transfer when the local transfer state signal indicates termination of data transfer to activate the interface portion.

5. The image processing device of claim 1, wherein encoding is performed as the processing of an image signal.

* * * * *

UNITED STATES PATENT AND TRADEMARK OFFICE
CERTIFICATE OF CORRECTION

PATENT NO.    : 6,597,810 B1
DATED         : July 22, 2003
INVENTOR(S)   : Takayuki Morishige It is certified that error appears in the above-identified patent and that said Letters Patent is hereby corrected as shown below:

Title page,
Item [54], Title, change "IMAGE PROCESSOR" to -- IMAGE PROCESSING DEVICE --;
Item [56], References Cited, U.S. PATENT DOCUMENTS, insert -- US 5,289,577 2/1994 --;
FOREIGN PATENT DOCUMENTS, insert
-- JP 7-121687 5/1995 --;
-- JP 6-187434 7/1994 --;
-- JP 6-20034 1/1994 --;
OTHER PUBLICATIONS, insert -- International Search Report dated September 28, 1999 --;

Signed and Sealed this

Twenty-ninth Day of June, 2004

JON W. DUDAS
*Acting Director of the United States Patent and Trademark Office*